(12) United States Patent
Benavides et al.

(10) Patent No.: US 11,924,185 B2
(45) Date of Patent: *Mar. 5, 2024

(54) METHOD AND SYSTEM FOR GENERAL DATA PROTECTION COMPLIANCE VIA BLOCKCHAIN

(71) Applicant: MASTERCARD INTERNATIONAL INCORPORATED, Purchase, NY (US)

(72) Inventors: Alonzo Benavides, San Francisco, CA (US); Ian Major, San Francisco, CA (US); Prem Chander Rajamohan, Jersey City, NJ (US); Thomas Hansen, San Francisco, CA (US); Duygu Gün, San Francisco, CA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/842,127

(22) Filed: Jun. 16, 2022

(65) Prior Publication Data
US 2022/0311755 A1 Sep. 29, 2022

Related U.S. Application Data

(63) Continuation of application No. 16/260,286, filed on Jan. 29, 2019, now Pat. No. 11,368,441.

(51) Int. Cl.
*H04L 9/40* (2022.01)
*G06F 16/903* (2019.01)
*H04L 9/00* (2022.01)

(52) U.S. Cl.
CPC .......... *H04L 63/061* (2013.01); *G06F 16/903* (2019.01); *H04L 63/0492* (2013.01); *H04L 63/0876* (2013.01); *H04L 63/107* (2013.01); *H04L 9/50* (2022.05)

(58) Field of Classification Search
None
See application file for complete search history.

(56) References Cited

U.S. PATENT DOCUMENTS

10,509,891 B2 12/2019 Solow et al.
10,607,027 B1 3/2020 Ben Naim et al.
11,580,253 B1 * 2/2023 Lyons ................. G06F 21/6245
(Continued)

*Primary Examiner* — Michael Pyzocha
(74) *Attorney, Agent, or Firm* — Panitch Schwarze Belisario & Nadel LLP (57) ABSTRACT

A method for privacy control in release of protected information includes: storing, in a memory of a first computing system, a plurality of data pairs, each of the plurality of data pairs including at least a decryption key and a registration identifier; receiving, by a receiver of the first computing system, a data request, the data request including at least a user identifier of a user associated with the data being requested in the data request; receiving, by the receiver of the first computing system, a registration identifier of the data being requested in the data request; identifying, by a processor of the first computing system, a data pair based on the registration identifier; and transmitting, by a transmitter of the first computing device, a decryption key of the identified data pair to a second computing system.

18 Claims, 5 Drawing Sheets

(56) References Cited

U.S. PATENT DOCUMENTS

| | | | |
|---|---|---|---|
| 2016/0308855 A1* | 10/2016 | Lacey | H04L 63/061 |
| 2017/0140375 A1 | 5/2017 | Kunstel | |
| 2018/0144153 A1* | 5/2018 | Pead | H04L 9/3236 |
| 2018/0322259 A1 | 11/2018 | Solow et al. | |
| 2019/0188700 A1* | 6/2019 | August | G06Q 20/3827 |
| 2019/0229890 A1 | 7/2019 | Brehmer et al. | |
| 2019/0251648 A1* | 8/2019 | Liu | G06Q 50/184 |
| 2019/0272291 A1* | 9/2019 | Imai | G06F 16/152 |
| 2019/0280855 A1 | 9/2019 | Tong | |
| 2019/0356493 A1* | 11/2019 | Fisher | H04L 9/3239 |
| 2020/0074102 A1* | 3/2020 | Pitti | H04L 9/3239 |
| 2020/0074111 A1* | 3/2020 | Mitchell | H04L 9/3247 |
| 2020/0084037 A1 | 3/2020 | Zhang et al. | |
| 2020/0106601 A1 | 4/2020 | Mishra | |
| 2020/0125766 A1* | 4/2020 | Yang | H04L 9/50 |
| 2020/0134217 A1* | 4/2020 | Vishnyakov | G06F 16/2456 |
| 2020/0134221 A1 | 4/2020 | Su et al. | |
| 2020/0162238 A1 | 5/2020 | Yoon et al. | |
| 2020/0177579 A1 | 6/2020 | Allen | |
| 2020/0184085 A1* | 6/2020 | Korten | H04L 63/0442 |
| 2020/0202018 A1* | 6/2020 | Ciocarlie | G06Q 40/08 |
| 2020/0380090 A1 | 12/2020 | Marion | |
| 2021/0049600 A1 | 2/2021 | Spector et al. | |
| 2021/0075623 A1 | 3/2021 | Petersen | |
| 2021/0081557 A1* | 3/2021 | Thomson-Wood | G06F 21/6218 |
| 2021/0157938 A1* | 5/2021 | Chen | H04L 9/088 |
| 2021/0160227 A1 | 5/2021 | Li et al. | |
| 2021/0248214 A1 | 8/2021 | Goldston et al. | |
| 2021/0264018 A1* | 8/2021 | Helles | G06F 21/45 |
| 2022/0198419 A1* | 6/2022 | McFarlane | G06Q 20/40 |
| 2023/0162286 A1* | 5/2023 | Lanier | G06Q 10/06393 705/7.39 |

\* cited by examiner

METHOD AND SYSTEM FOR GENERAL DATA PROTECTION COMPLIANCE VIA BLOCKCHAIN

FIELD

The present disclosure relates to privacy control in release of protected information, specifically the use of a blockchain and a centralized key engine for the fast and efficient distribution of protected data with proper user permissions for compliance with data protection regulations.

BACKGROUND

As more and more information about individuals can be found on the Internet, many individuals have started to place a greater focus on their individual privacy. In some cases, the push towards individual data protection has become so great that governments and other regulatory bodies have passed regulations, laws, and other rules that serve to protected an individual's data. Such regulations often limit the ability for an entity to collect such data, enforce how such data can or must be stored, set requirements for enabling an individual to control access to such data, and specify penalties for violation of the regulations. The results are systems that require significant changes and improvements in an entity's systems, but result in stronger and more controlled data protection for individuals.

However, these changes and improvements necessitated by these systems to comply with regulations can be extremely difficult, time consuming, and costly to implement. In addition, many entities, such as small businesses, may lack the sophistication and expertise to implement a system that complies with all regulations. In these cases, such entities often rely on third parties to store and manage user data. However, these entities are then at the mercy of third parties, many of whom may not be trusted by individuals and thus result in loss of a customer base, and therefore revenue. Thus, there is a need for a technical system where protected data can be stored safely and securely to provide for privacy control for individuals while requiring minimal interaction by a requesting system.

SUMMARY

The present disclosure provides a description of systems and methods for privacy control in release of protected information. Such systems involve three distinct components: a key engine, a decryption system, and the system of the entity that is requesting user data, referred to herein as a requesting system. A blockchain is used to store protected user data, where the data stored in the blockchain is encrypted by a key unique to the respective user. When a requesting system requests user data, the user gives permission to the key engine to release the decryption key that was used to encrypt the user's data on the blockchain. The key engine provides the key to the decryption system, which identifies the encrypted data package on the blockchain and decrypts it. The decrypted user data is then forwarded on to the requesting system. The requesting system thus receives the user data after simply submitting a request, making it easier for a small business or other entity to implement the disclosed system. At the same time, the storage of the user data in a blockchain ensures that the data cannot be tampered with, and that the user data cannot be changed without a new blockchain entry, which necessitates the use of a new decryption key, thereby preventing any unauthorized entity from accessing updated user data. As a result, the methods and systems discussed herein provide for data protection for users that can be compliant with even the strictest of regulations through a system where participation by users and requesting entities involves minimal effort.

A method for privacy control in release of protected information includes: storing, in a memory of a first computing system, a plurality of data pairs, each of the plurality of data pairs including at least a decryption key and a registration identifier; receiving, by a receiver of the first computing system, a data request, the data request including at least a user identifier of a user associated with the data being requested in the data request; receiving, by the receiver of the first computing system, a registration identifier of the data being requested in the data request; identifying, by a processor of the first computing system, a data pair based on the registration identifier; and transmitting, by a transmitter of the first computing device, a decryption key of the identified data pair to a second computing system.

A system for privacy control in release of protected information includes: a memory of a first computing system configured to store a plurality of data pairs, each of the plurality of data pairs including at least a decryption key and a registration identifier; a receiver of the first computing system configured to: receive a data request, the data request including at least a user identifier of a user associated with the data being requested in the data request, receive a registration identifier of the data being requested in the data request; a processor of the first computing system configured to identify a data pair based on the registration identifier; and a transmitter of the first computing system configured to transmit a decryption key of the identified data pair to a second computing system.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency or other data storage that many, in some case, not be related to financial transactions or other data transactions. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Privacy Control in Release of Protected Information

Figure 1:
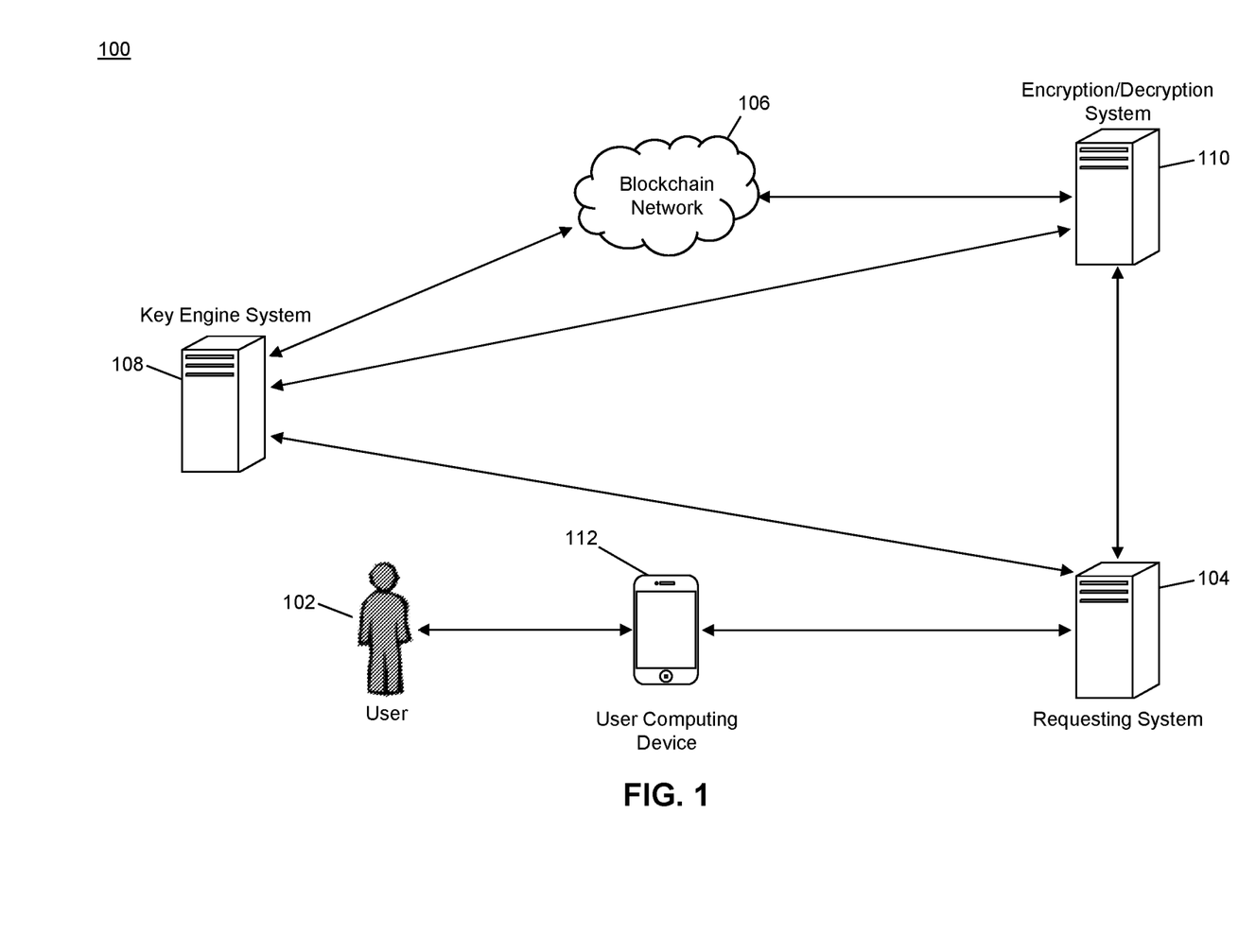
FIG. 1 is a block diagram illustrating a high level system architecture for privacy control in release of protected information in accordance with exemplary embodiments.

FIG. 1 illustrates a system 100 for the control of access to protected information via the use of a blockchain for compliance with data protection regulations through the use of a key engine and separate decryption system.

The system 100 may include a user 102. The user 102 may have personal data associated therewith that the user 102 may wish to maintain control over in terms of what data of theirs is accessed, what entities have rights to their data, when their data can be accessed, etc., including the ability to make changes to their data, change data permissions, revoke the ability to access their data, etc. As discussed herein, such data may be referred to as "user data," "individual data," "protected data," or "protected information."

In the system 100, a requesting system 104 may have an interest in obtaining the user's protected data. The requesting system 104 may be a merchant, advertiser, employer, service provider, or any other type of entity that may have an interest in a user's protected information. In the system 100, the user's protected information may be stored in a blockchain that is associated with a blockchain network 106.

The blockchain network 106 may be comprised of a plurality of nodes. Each node may be a computing system that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, Date-Time, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 106 prior to the generation and addition of a new block to the blockchain in order for the change to be made permanent. Computational and communication limitations may make such a modification exceedingly difficult, if not impossible, thus rendering the blockchain immutable.

Each blockchain data value may correspond to a stored set of protected information for a user 102. Each blockchain data value may thus include at least an identifier, referred to herein as a "registration identifier," and an encrypted data set. The registration identifier may be a value used for the identification of the blockchain data value that is unique to the specific blockchain data value. In some cases, each user 102 may be associated with a single registration identifier. In other cases, a user 102 may have multiple registration identifiers associated therewith. For example, the user 102 may have multiple sets of protected information stored in the blockchain, such as a first set available for a first type of entity and a second set available for a second type of entity. In some such instances, a blockchain data value may have a first identifier associated with the user 102 in addition to the registration identifier.

Each set of protected information stored in the blockchain may be encrypted using an encryption key. Each encryption key may have a corresponding decryption key or may also serve as a decryption key that is able to decrypt data that is encrypted using the encryption key. In the system 100, decryption keys may be stored in a key engine system 108. The key engine system 108 may be configured to store a plurality of data pairs, wherein each data pair is comprised of at least a decryption key and a registration identifier. In some embodiments, a data pair may further include a user identifier, or the key engine system 108 may store user profiles that may include a user identifier as well as a data pair for each set of protected information stored in the blockchain for the user 102. In some cases, the key engine system 108 may be configured to encrypt protected information for storage in the blockchain using the respective encryption key. In other cases, the key engine system 108 may not have access to unencrypted protected data. In such cases, third party systems may be used to encrypt protected information and/or submit protected information to the blockchain network 106 for inclusion in the blockchain.

The system 100 may also include an encryption/decryption system 110. The encryption/decryption system 110 may be configured to decrypt sets of protected data stored in blockchain data values in the blockchain using the appropriate decryption key. In an exemplary embodiment, the encryption/decryption system 110 may only be configured to receive decryption keys for the decryption of protected user data when authorized by the user 102 and may be further configured to delete any decryption key after use and to refrain from storing any decrypted protected information. As discussed herein, the encryption/decryption system 110 may be configured to perform any encryption or decryption functions as necessary to accomplish the functions discussed herein.

In the system 100, the key engine system 108 may receive a request for protected information. In some cases, the request may be submitted directly by the requesting system 104 that is requesting the protected information. In other cases, the request may be submitted by the user 102 through a user computing device 112. The user computing device 112 may be any type of computing device that is specially configured to perform the functions discussed herein, such as a specially configured desktop computer, laptop computer, notebook computer, tablet computer, cellular phone, smart phone, smart watch, smart television, wearable computing device, etc. The key engine system 108 may receive the request, which may include at least a user identifier associated with the user 102. In some cases, the request may further include the registration identifier for the protected information being requested. In other cases, the key engine system 108 may be configured to identify the registration identifier. For instance, in a first example, the requesting system 104 may submit a request to the key engine system 108 for protected information of the user 102, and the requesting system 104 may request authorization from the user 102 (e.g., through the user computing device 112), where the user 102 may authenticate themselves using any suitable method and select what type of protected information (e.g., and thus the corresponding registration identifier) is to be provided to the requesting system 104. In a second example, the requesting system 104 may request protected information from the user 102, and the user 102 may submit (e.g., via the user computing device 112) the request to the key engine system 108 for a specific set of protected information through the corresponding registration identifier. In some embodiments, the request may further include value identifying the requesting system 104 or otherwise usable in providing communications to the requesting system 104. Such communication data, also referred to herein as a "request identifier," may include an internet protocol address, telephone number, e-mail address, network address, identification value, etc.

The key engine system 108 may thus receive and/or identify a registration identifier. The key engine system 108 may identify a data pair stored therein that includes the registration identifier and identify the decryption key stored therein. The key engine system 108 may then electronically transmit the decryption key and the registration identifier to the encryption/decryption system 110 using a suitable communication method and system. The encryption/decryption system 110 may receive the decryption key and registration identifier and then identify the blockchain data value stored in the blockchain that includes the registration identifier. In some embodiments, the encryption/decryption system 110 may be configured to store a local copy of the blockchain and may identify the blockchain data value therein. In one such embodiment, the encryption/decryption system 110 may be a node in the blockchain network 106. In other embodiments, the encryption/decryption system 110 may electronically transmit the registration identifier to a node in the blockchain network 106 and may receive the blockchain data value therefrom. The encryption/decryption system 110 may then decrypt the encrypted data set included in the blockchain value using the received decryption key. The decrypted data set may then be electronically transmitted to the requesting system 104 using a suitable communication network and method. In one embodiment, the encryption/decryption system 110 may electronically transmit the decrypted data set directly to the requesting system 104 (e.g., using information included in the submitted request, forwarded to the decryption system by the key engine system 108). In another embodiment, the encryption/decryption system 110 may transmit the decrypted data set to the key engine system 108 for forwarding to the requesting system 104. In some such embodiments, the key engine system 108 may discard the decrypted data set such that it does not store any decrypted protected information. The requesting system 104 may thereby receive the user's protected information.

The methods and systems discussed herein thus enable a user 102 to control access to their protected information. If the user 102 wants to create separate data sets, such that some entities have access to some protected information while others have access to other protected information, the user 102 can do so via the use of multiple encrypted data sets stored in the blockchain, differentiated via the registration identifier. Similarly, when the user 102 updates their user data, a new encrypted data set must be created due to the immutability of the blockchain, which thus requires a new decryption key to be accessed. The result is that any requesting system 104 that has access to a user's decrypted data at one point will not have access to any updated protected information without explicit user authorization. Thus, a user 102 has complete control over their protected information. Such systems may therefore be compliant with even the strictest data privacy regulations regarding general data protection.

In instances where a user 102 may have multiple encrypted data sets stored in the blockchain, the user may have a registration identifier associated with each encrypted data set, which they may use to have the corresponding protected information distributed. In some cases, each item of protected information may have its own registration identifier associated therewith. For instance, the user 102 may be able to provide a registration identifier for every individual item of protected information (e.g., one for name, one for age, one for address, one for zip code, etc.), where each of those registration identifiers may be used to identify a key that is forwarded from the key engine system 108 to the encryption/decryption system 110 for retrieval of the respective item.

In some embodiments, the system 100 may include a plurality of encryption/decryption systems 110 physically located at different geographic locations. In such embodiments, the key engine system 108 may be configured to select a specific encryption/decryption system 110 based on its geographic location as well as a geographic location of the requesting system 104. The geographic location of the requesting system 104 may be included in the request for protected information submitted to the key engine system 108. The key engine system 108 may then select the encryption/decryption system 110 that is located closest to the requesting system 104 (e.g., geographically, such as having the shortest geographic distance, or communicatively, such as having the shortest communication path) or that is located in a geographic area that includes the requesting system 104. For example, due to applicable regulations or rules, the encryption/decryption system 110 may be required to be in the same country as the requesting system 104. In such a case, the key engine system 108 may select the encryption/decryption system 110 that is closest to the requesting system 104 in the same country, even if a different encryption/decryption system 110 is closer geographically. In these embodiments, the system 100 can comply with even stricter data privacy regulations.

The use of geographic locations to select encryption/decryption systems 110 can also improve communication speeds and reduce network bandwidth used in the system 100. The key engine system 108 only transmits the decryption key, registration identifier, and communication data for the requesting system 104 to the encryption/decryption system 110 regardless of the amount of protected information being provided to the requesting system 104, resulting in a low amount of bandwidth required. If the closest possible encryption/decryption system 110 is selected to transmit the decrypted data set to the requesting system 104, there is a shorter distance for the decrypted data set to travel, resulting in faster communications as well as less overall bandwidth used in the system 100. Thus, the systems and methods discussed herein can comply with any manner of data privacy regulations while at the same time improving on system bandwidth and communication speeds.

Computing System

Figure 2:
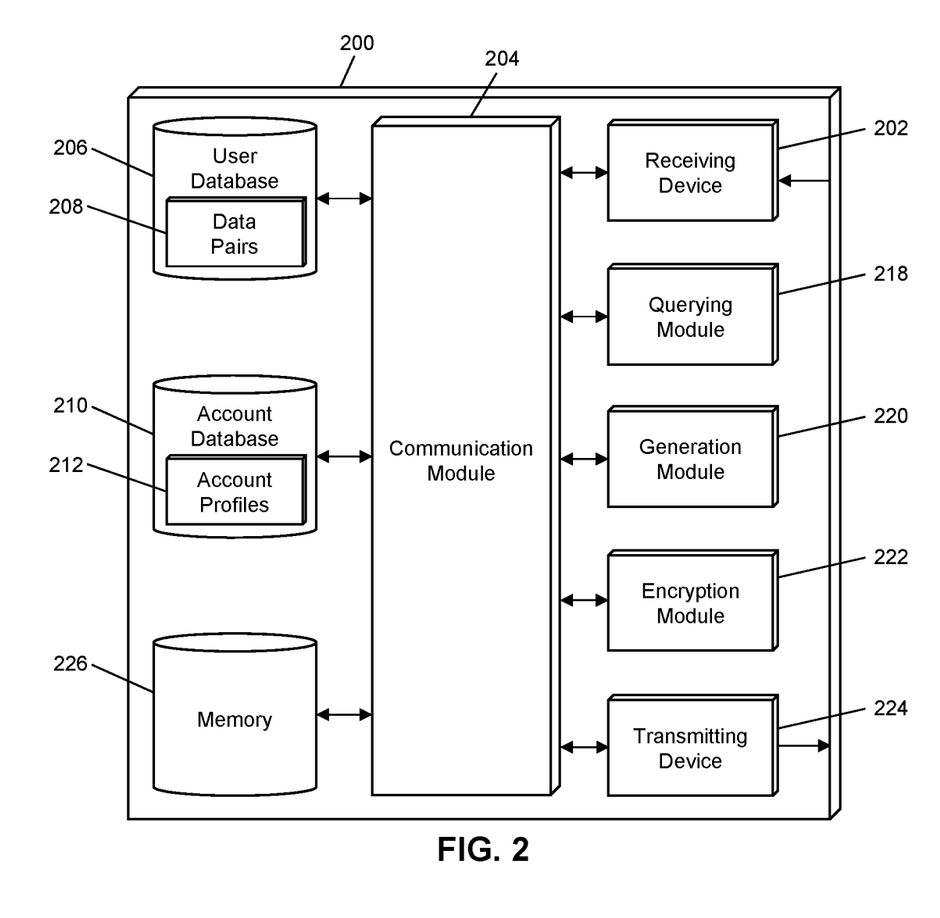
FIG. 2 is a block diagram illustrating a computing system for use in the system of FIG. 1 for the control of the release of protected information via a blockchain in accordance with exemplary embodiments.

FIG. 2 illustrates an embodiment of a computing system 200 in the system 100. It will be apparent to persons having skill in the relevant art that the embodiment of the computing system 200 illustrated in FIG. 2 is provided as illustration only and may not be exhaustive to all possible configurations of the computing system 200 suitable for performing the functions as discussed herein. For example, the computer system 500 illustrated in FIG. 5 and discussed in more detail below may be a suitable configuration of the computing system 200. The requesting system 104, key engine system 108, and encryption/decryption system 110 may each be implemented as the computing system 200 as well as the computer system 500 if specifically configured to perform the functions associated therewith.

The computing system 200 may include a receiving device 202. The receiving device 202 may be configured to receive data over one or more networks via one or more network protocols. In some instances, the receiving device 202 may be configured to receive data from requesting systems 104, blockchain networks 106, key engine systems 108, encryption/decryption systems 110, user computing devices 112, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive, for instance, data signals that are superimposed or otherwise encoded with requests for protected information. Such requests may include registration identifiers and/or user identifiers and communication data. The receiving device 202 may also be configured to receive data signals electronically transmitted by user computing devices 112 that are superimposed or otherwise encoded with authentication data, registration identifiers, and other data as discussed herein. The receiving device 202 may be configured to receive data signals electronically transmitted by nodes in blockchain networks 106 that are superimposed or otherwise encoded with blockchain data including blockchain data values comprised of registration identifiers, encrypted data sets, and other data. The receiving device 202 may also be configured to receive data signals electronically transmitted by key engine systems 108 that may be superimposed or otherwise encoded with registration identifiers, decryption keys, and communication data. The receiving device 202 may also be configured to receive data signals that are superimposed or otherwise encoded with decrypted data sets.

The computing system 200 may also include a communication module 204. The communication module 204 may be configured to transmit data between modules, engines, databases, memories, and other components of the computing system 200 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the computing system 200 and external components of the computing system 200, such as externally connected databases, display devices, input devices, etc. The computing system 200 may also include a processing device. The processing device may be configured to perform the functions of the computing system 200 discussed herein as will be apparent to persons having skill in the relevant art. In some embodiments, the processing device may include and/or be comprised of a plurality of engines and/or modules specially configured to perform one or more functions of the processing device, such as a querying module 218, generation module 220, encryption module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The computing system 200 may include a user database 206. The user database 206 may be configured to store a plurality of data pairs 208 using a suitable data storage format and schema. The user database 206 may be a relational database that utilizes structured query language for the storage, identification, modifying, updating, accessing, etc. of structured data sets stored therein. Each data pair 208 may be a structured data set configured to store data related to a set of protected information. A data pair 208 may include at least a registration identifier and a decryption key. In some cases, a data pair 208 may further include a user identifier and/or information that may be used by a user 102 or other entity in determining the data set to which it corresponds, such as description information set by the user 102.

The computing system 200 may also include an account database 210. The account database 210 may be configured to store a plurality of account profiles 212 using a suitable data storage format and schema. The account database 210 may be a relational database that utilizes structured query language for the storage, identification, modifying, updating, accessing, etc. of structured data sets stored therein. In some embodiments, account profiles 212 may be a structured data set configured to store data related to a user 102. Such an account profile 212 may include, for instance, a user identifier, a plurality of data pairs 208 for the user 102, authentication information, communication information associated with a user computing device 112, user data permissions for requesting systems 104, etc. In some cases, account profiles 212 may be structured data sets configured to store data related to encryption/decryption systems 110, such as may include geographic location and/or area information, communication information, etc. In some instances, account profiles 212 may be structured data sets configured to store data related to requesting systems 104, which may include communication data, user data permissions, etc.

The computing system 200 may include a querying module 218. The querying module 218 may be configured to execute queries on databases to identify information. The querying module 218 may receive one or more data values or query strings, and may execute a query string based thereon on an indicated database, such as the user database 206, to identify information stored therein. The querying module 218 may then output the identified information to an appropriate engine or module of the computing system 200 as necessary. The querying module 218 may, for example, execute a query on the user database 206 to identify a data pair 208 that includes a registration identifier included in a received data request to identify the decryption key included therein.

The computing system 200 may also include a generation module 220. The generation module 220 may be configured to generate data for use by the computing system 200 in performing the functions discussed herein. The generation module 220 may receive instructions as input, may generate data based on the instructions, and may output the generated data to one or more modules of the computing system 200. For example, the generation module 220 may be configured to generate encryption keys, key pairs comprised of an encryption key and a corresponding decryption key, identifiers, data messages, etc. In embodiments where the computing system 200 (e.g., the encryption/decryption system 110) may be a node in the blockchain network 106, the generation module 220 may be configured to generate block headers, blocks, reference values, blockchain data values, and other data for use in performing the functions of a node in the blockchain network 106.

The computing system 200 may also include an encryption module 222. The encryption module 222 may be configured to encrypt and/or decrypt data for the computing system 200 as part of the functions discussed herein. The encryption module 222 may be configured to receive data to be encrypted or decrypted as input, may encrypt or decrypt the data as instructed, and may output the resulting encrypted or decrypted data to another module or engine of the computing system 200. In some cases, the input may include the key to be used to perform the encryption or decryption. In other cases, the encryption module 222 may be configured to identify the key to be used, such as in a data pair 208, received in a data message, etc. Any suitable type of encryption strategy, technique, and/or algorithm may be used, such as symmetric encryption.

The computing system 200 may also include a transmitting device 224. The transmitting device 224 may be configured to transmit data over one or more networks via one or more network protocols. In some instances, the transmitting device 224 may be configured to transmit data to requesting systems 104, blockchain networks 106, key engine systems 108, encryption/decryption systems 110, user computing devices 112, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to transmit, for instance, data signals that are superimposed or otherwise encoded with requests for protected information. Such requests may include registration identifiers and/or user identifiers and communication data. The transmitting device 224 may also be configured to transmit data signals to key engine systems 108 that are superimposed or otherwise encoded with authentication data, registration identifiers, and other data as discussed herein. The transmitting device 224 may be configured to transmit data signals electronically transmitted to nodes in blockchain networks 106 that are superimposed or otherwise encoded with blockchain data including blockchain data values comprised of registration identifiers, encrypted data sets, and other data. The transmitting device 224 may also be configured to transmit data signals to encryption/decryption systems 110 that may be superimposed or otherwise encoded with registration identifiers, decryption keys, and communication data. The transmitting device 224 may also be configured to transmit data signals that are superimposed or otherwise encoded with decrypted data sets. In some embodiments, the transmitting device 224 may be configured to electronically transmit data signals to nodes in a blockchain network 106 that are superimposed or otherwise encoded with blockchain data values or data for inclusion therein, such as encrypted data sets and registration identifiers.

The computing system 200 may also include a memory 226. The memory 226 may be configured to store data for use by the computing system 200 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the computing system 200 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, blockchain data, hashing algorithms for generating blocks, privacy rules and regulations, geographic location and/or area data, blockchain data, encryption algorithms, key generation algorithms, etc.

Process for Privacy Control Via Blockchain

Figure 3:
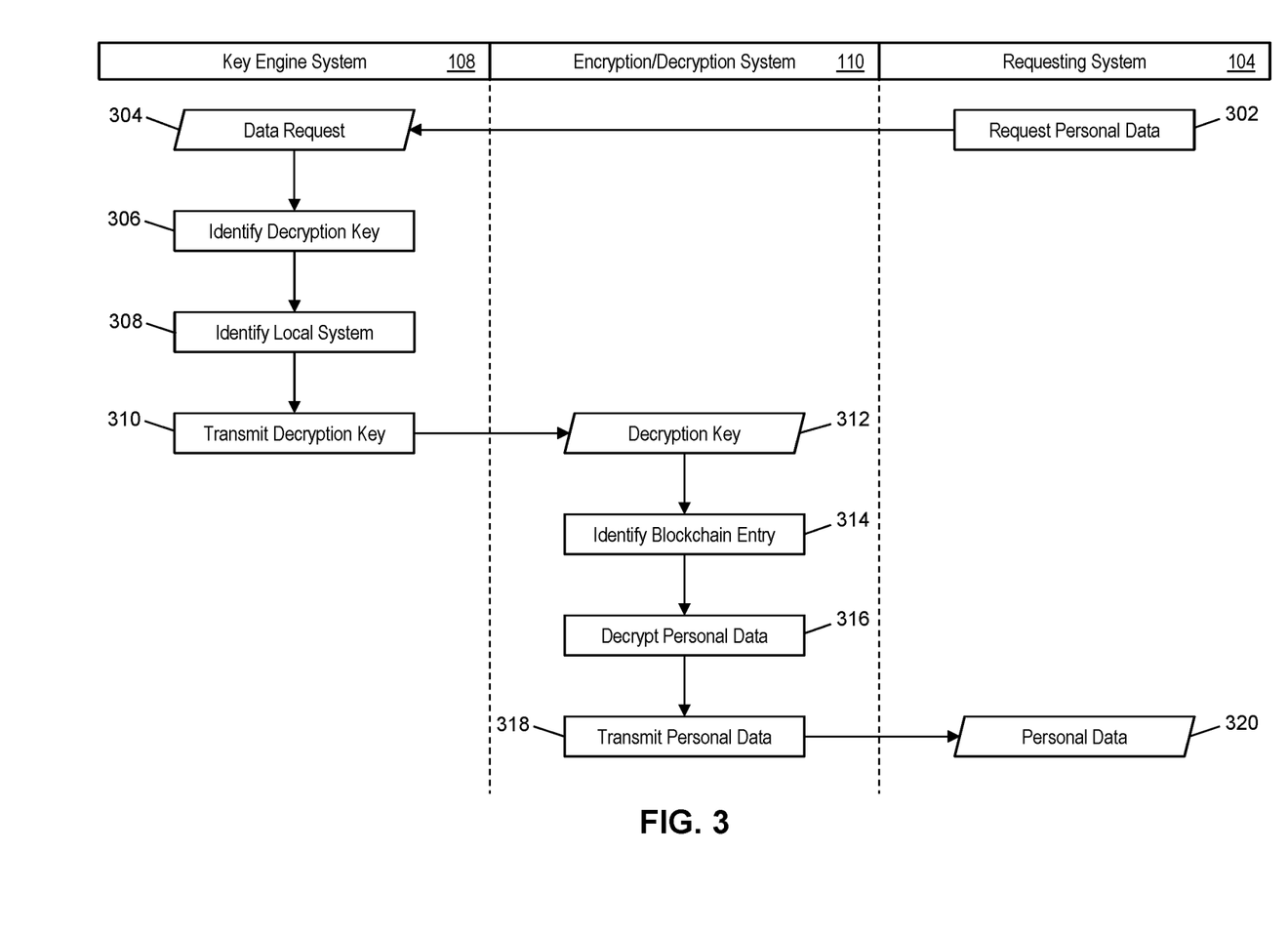
FIG. 3 is a flow diagram illustrating a process for privacy control in release of protected information in accordance with exemplary embodiments.

FIG. 3 illustrates an example process executed in the system 100 for the control of privacy of protected user information through the use of a blockchain, encryption, and separate computing systems.

In step 302, the requesting system 104 may electronically transmit (e.g., via a transmitting device 224) a data request for personal data for the user 102 to the key engine system 108 using a suitable communication network and method. In some embodiments, the request may be submitted by the user 102 (e.g., via the user computing device 112) on behalf of the requesting system 104. In step 304, a receiving device 202 of the key engine system 108 may receive the data request. The data request may include at least a registration identifier and a geographic location of the requesting system 104. In some cases, the data request may also include a user identifier, communication data, or any other data as discussed herein.

In step 306, a querying module 218 of the key engine system 108 may execute a query on a user database 206 thereof to identify a specific data pair 208 that includes the registration identifier included in the received data request. The specific data pair 208 may include the registration identifier and a decryption key. In step 308, the key engine system 108 may identify a encryption/decryption system 110 that is in the same geographic area as the requesting system 104 based on the geographic location included in the received data request. In step 310, a transmitting device 224 of the key engine system 108 may electronically transmit at least the decryption key, registration identifier, and communication data associated with the requesting system 104 to the identified encryption/decryption system 110.

In step 312, a receiving device 202 of the encryption/decryption system 110 may receive the decryption key and accompanying data. In step 314, a querying module 218 of the encryption/decryption system 110 may execute a query on a memory 226 thereof to identify a blockchain data value included in blockchain data stored therein that includes the registration identifier received from the key engine system 108. In step 316, an encryption module 222 of the encryption/decryption system 110 may decrypt the encrypted data set included in the identified blockchain data value using the received decryption key. In step 318, a transmitting device 224 of the encryption/decryption system 110 may electronically transmit the decrypted data set to the requesting system 104 using the communication data associated therewith. In step 320, a receiving device 202 of the requesting system 104 may receive the decrypted data set as the personal data of the user 102.

Exemplary Method for Privacy Control in Release of Protected Information

Figure 4:
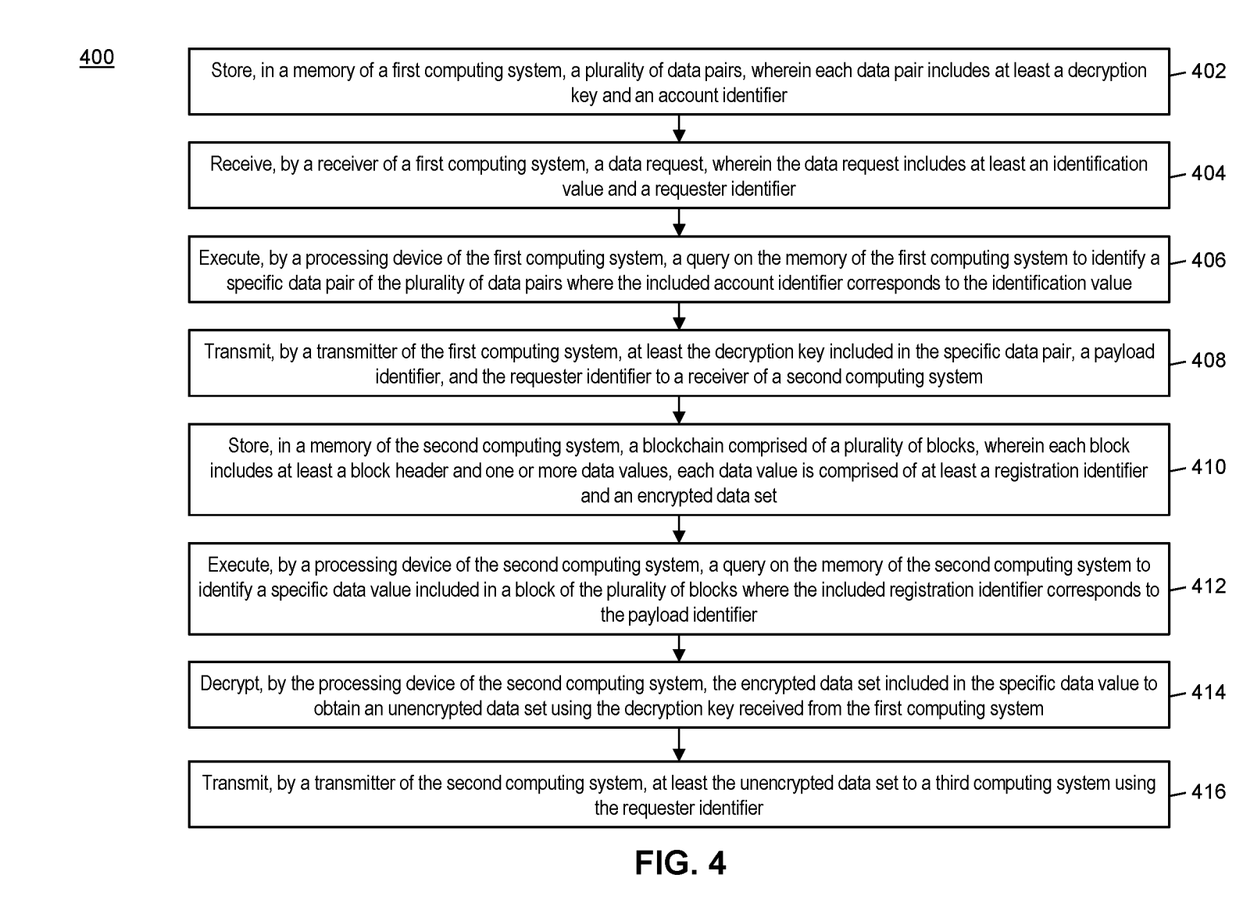
FIG. 4 is a flow chart illustrating an exemplary method for privacy control in release of protected information in accordance with exemplary embodiments.

FIG. 4 illustrates a method 400 for the control of user data privacy in the release of and access to protected information through the use of separate computing systems and a blockchain.

In step 402, a plurality of data pairs (e.g., data pairs 208) may be stored in a memory (e.g., user database 206, account database 210, memory 226, etc.) of a first computing system (e.g., the key engine system 108), wherein each data pair includes at least a decryption key and an account identifier. In step 404, a data request may be received by a receiver (e.g., receiving device 202) of the first computing system, a data request, wherein the data request includes at least an identification value and a requester identifier.

In step 406, a query may be executed on the memory of the first computing system by a processing device (e.g., querying module 218) of the first computing system to identify a specific data pair of the plurality of data pairs where the included account identifier corresponds to the identification value. In step 408, a transmitter (e.g., transmitting device 224) of the first computing system may transmit at least the decryption key included in the specific data pair, a payload identifier, and the requester identifier to a receiver (e.g., receiving device 202) of a second computing system (e.g., the encryption/decryption system 110).

In step 410, a blockchain comprised of a plurality of blocks may be stored in a memory (e.g., memory 226) of the second computing system, wherein each block includes at least a block header and one or more data values, each data value is comprised of at least a registration identifier and an encrypted data set. In step 412, a query may be executed on the memory of the second computing system by a processing device (e.g., querying module 218) of the second computing system to identify a specific data value included in a block of the plurality of blocks where the included registration identifier corresponds to the payload identifier.

In step 414, the processing device (e.g., encryption module 222) of the second computing system may decrypt the encrypted data set included in the specific data value to obtain an unencrypted data set using the decryption key received from the first computing system. In step 416, a transmitter (e.g., transmitting device 224) of the second computing system may transmit at least the unencrypted data set to a third computing system using the requester identifier.

In one embodiment, transmission from the first computing system to the second computing system may utilize at least one external network. In some embodiments, the method 400 may further include receiving, by the receiver of the first computing system, a permission message including at least the payload identifier from an external computing device (e.g., the user computing device 112). In a further embodiment, the permission message may further include the identification value. In one embodiment, the specific data pair may further include the payload identifier.

In some embodiments, the method 400 may also include storing, in the memory of the first computing system, an account profile (e.g., account profile 212), wherein the account profile includes at least the requester identifier and a geographic location, wherein the second computing system is located in a geographic area that includes the geographic location. In a further embodiment, the second computing system may be selected by the first computing system from a plurality of potential systems based on the geographic area and the geographic location. In another further embodiment, the third computing system may be located in the geographic area that includes the geographic location.

Computer System Architecture

Figure 5:
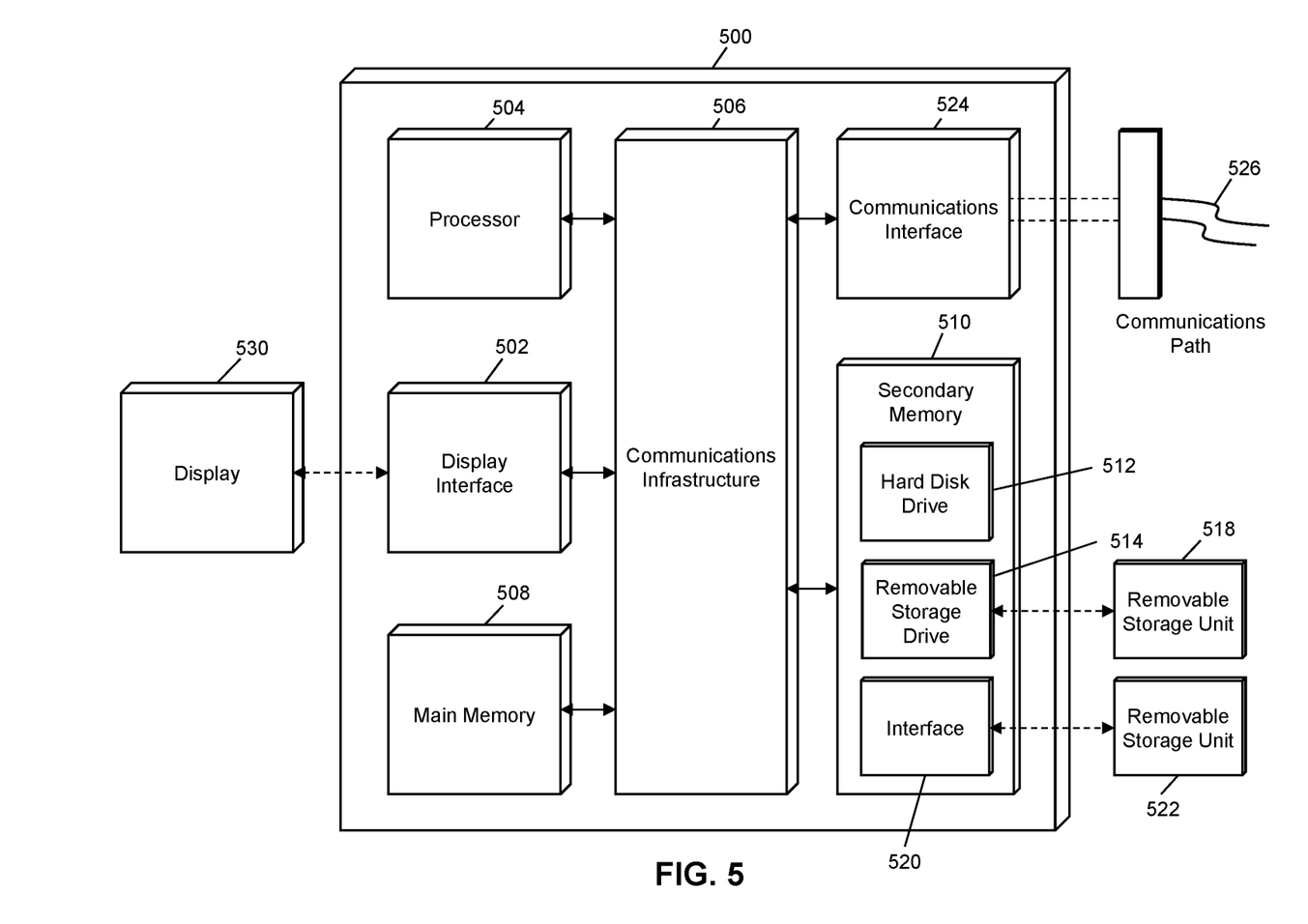
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the requesting system 104, key engine system 108, and encryption/decryption system 110 of FIG. 1 and the computing system 200 of FIG. 2 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein.

Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for privacy control in release of protected information. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for privacy control in release of protected information, comprising:
storing, in a memory of a first computing system, a plurality of data pairs, each of the plurality of data pairs including at least a decryption key and a registration identifier;
receiving, by a receiver of the first computing system, a third-party data request for a user's data stored on a blockchain, the data request including at least a user identifier of a user associated with the data being requested in the data request;
receiving, by the receiver of the first computing system, a registration identifier of the data being requested in the data request, the registration identifier identifying a specific blockchain data value on the blockchain, the specific blockchain data value corresponding to a set of data associated with the user;
identifying, by a processor of the first computing system, a data pair based on the registration identifier, the data pair including the registration identifier and a decryption key; and
transmitting, by a transmitter of the first computing device, a decryption key of the identified data pair to a second computing system associated with the blockchain.

2. The method of claim 1, wherein each of the plurality of data pairs is stored in a user profile, the user profile including a user identifier of a user associated with the data pair.

3. The method of claim 1, wherein the data request is received from a third computing system associated with the third-party.

4. The method of claim 3, including:
storing, in the memory of the first computing system, a plurality of account profiles, each of the plurality of account profiles associated with one of a plurality of second computing systems, each of the plurality of account profiles including at least a geographic location of the second computing system.

5. The method of claim 4, wherein the data request includes a geographic location of the third computing system, the method including:
selecting, by the processor of the first computing system, the second computing system from the plurality second computing systems based on the geographic location of the third computing system and the geographic location included in the account profile of the second computing system.

6. The method of claim 1, wherein the data request is received from the user associated with the data being requested, and wherein the data request includes a value identifying a third computing system associated with the third-party.

7. The method of claim 6, including:
receiving, by the receiver of the first computing system, the registration identifier from the user associated with the data.

8. The method of claim 1, wherein the registration identifier is included in the data request.

9. The method of claim 1, wherein the first computing system transmits the decryption key to the second computing system via an external network.

10. A system for privacy control in release of protected information, comprising:
a memory of a first computing system configured to store a plurality of data pairs, each of the plurality of data pairs including at least a decryption key and a registration identifier;
a receiver of the first computing system configured to:
receive a third-party data request for a user's data stored on a blockchain, the data request including at least a user identifier of a user associated with the data being requested in the data request,
receive a registration identifier of the data being requested in the data request, the registration identifier identifying a specific blockchain data value on the blockchain, the specific blockchain data value corresponding to a set of data associated with the user;
a processor of the first computing system configured to identify a data pair based on the registration identifier, the data pair including the registration identifier and a decryption key; and
a transmitter of the first computing system configured to transmit a decryption key of the identified data pair to a second computing system associated with the blockchain.

11. The system of claim 10, wherein each of the plurality of data pairs is stored in a user profile, the user profile including a user identifier of a user associated with the data pair.

12. The system of claim 10, wherein the data request is received from a third computing system associated with the third-party.

13. The system of claim 12, including:
the memory of the first computing system configured to store a plurality of account profiles, each of the plurality of account profiles associated with one of a plurality of second computing systems, each of the plurality of account profiles including at least a geographic location of the second computing system.

14. The system of claim 13, wherein the data request includes a geographic location of the third computing system, the method including:
the processor of the first computing system configured to select the second computing system from the plurality second computing systems based on the geographic location of the third computing system and the geographic location included in the account profile of the second computing system.

15. The system of claim 10, wherein the data request is received from the user associated with the data being requested, and wherein the data request includes a value identifying a third computing system associated with the third-party.

16. The system of claim 15, including:
the receiver of the first computing system configured to receive the registration identifier from the user associated with the data.

17. The system of claim 10, wherein the registration identifier is included in the data request.

18. The system of claim 10, wherein the first computing system transmits the decryption key to the second computing system via an external network.

* * * * *